United States Patent [19]
Savolainen

[11] Patent Number: 5,834,042
[45] Date of Patent: Nov. 10, 1998

[54] METHOD FOR ISOLATING WHEY PROTEINS

[76] Inventor: Jouko Savolainen, Kuurinniityntie 26, FIN-02700 Kauniainen, Finland

[21] Appl. No.: 619,666

[22] PCT Filed: Feb. 22, 1995

[86] PCT No.: PCT/FI95/00091

§ 371 Date: Nov. 14, 1996

§ 102(e) Date: Nov. 14, 1996

[87] PCT Pub. No.: WO95/22907

PCT Pub. Date: Aug. 31, 1995

[30] Foreign Application Priority Data

Feb. 23, 1994 [FI] Finland ..................... 940846

[51] Int. Cl.$^6$ ....................................... A23J 1/20
[52] U.S. Cl. ........................... 426/41; 424/535; 426/583; 530/366; 514/2
[58] Field of Search .................... 424/535; 426/583, 426/41; 530/366; 514/2

[56] References Cited

PUBLICATIONS

Juan M. Gonzalez, et al., "Recovery of Proteins from Raw Sweet Whey Using a Solid State Sulfitolysis", Journal of Food Science, vol. 55, No. 6, 1990, pp. 1559–1563.

*Primary Examiner*—Cecilia J. Tsang
*Assistant Examiner*—David Lukton
*Attorney, Agent, or Firm*—Loeb & Loeb LLP

[57] ABSTRACT

The invention relates to a method for isolating proteins from whey, wherein the whey or a concentrate thereof, a reagent which forms sulfite ions, and an oxidative compound are contacted in order to sulfitolyze and oxidize the whey protein, the sulfitolyzed and oxidized whey protein is precipitated out from the whey or concentrate thereof at an acid pH, and the precipitated sulfitolyzed and oxidized whey protein is recovered from the product mixture, and an after-treatment is possibly performed on it. When a food-grade oxidative compound is used as the oxidant and a temperature within the range 25°–55° C. is used, the oxidative compound can be caused to react directly with the sulfitolyzed whey protein, and thus the disadvantages associated with the use of a catalyst are eliminated.

38 Claims, No Drawings

METHOD FOR ISOLATING WHEY PROTEINS

BACKGROUND OF THE INVENTION

1. Field of the Invention

The invention relates to a method for isolating protein from whey, wherein a) whey or a concentrate thereof, a reagent which forms sulfite ions, and an oxidant are brought into contact in order to sulfonate, i.e. sulfitolyze, and oxidize the whey protein, b) the sulfitolyzed and oxidized whey protein is precipitated out from the whey or concentrate thereof at an acid pH, and c) the precipitated sulfitolyzed and oxidized whey protein is recovered from the product mixture and is possibly subjected to an after-treatment.

2. Description of the Related Art

Whey proteins are totally superior to other food proteins as regards their nutritional value and, in particular, their lysin and methionine contents. The recovery of whey proteins and their use in human food would also reduce the costs of cheese production. Although the use of whey protein for human food does have potential, the principal obstacles to its use seem at present to be (1) the high cost of its recovery process and (2) the poor functional properties, i.e. solubility, emulsifiability, gel formation capacity, and foaming capacity, of the concentrate or isolate.

The isolation of whey proteins is complicated by their high solubility, and this cannot be affected by a pH adjustment within the range pH 2–9 while the proteins are in their native form. The isolation of the proteins takes place according to four principal methods: 1. denaturation and precipitation; 2. ultrafiltration; 3. ion exchange; and 4. chemical modification and precipitation.

The most commonly known method for the isolation of whey proteins is denaturation, i.e. heating together with the lowering of the pH to the acid side. The isolation can be carried out economically, for example, as follows: the whey is concentrated to a dry matter content of approx. 20%; the pH is adjusted to the range 6.0–7.0; the proteins are denatured by maintaining the temperature above 90° C. for 10–30 minutes, whereafter the proteins are precipitated by lowering the pH to 4.4–5.0. The protein obtained as a result has lost almost all of its most important functional properties. It is used mainly in various spreads, e.g. processed cheeses, to replace cheese in part or entirely. Hill et al., Can. Int. Food Sci. Technol. J. 15, (1982) 155–160.

Nowadays whey proteins are isolated mainly as a protein concentrate by ultrafiltration and by drying, or as a protein isolate by using ion exchange adsorption techniques and by drying. By both methods it is possible to obtain the isolated proteins in a functional form. The decisive factor in the selection of even these production methods is the functionality of the product and the costs of its production.

There is great variation in the composition, functionality and organoleptic properties of the protein concentrates, and therefore industry shuns their use. The variation is due to different compositions of whey, and to differences in its pretreatment and in the preparation and treatment conditions.

In protein isolates, also, there is variation in the various properties for the above reasons. The ion exchange adsorption method for their preparation levels out the variation to some degree and yields an end product having a composition different from that of protein concentrate.

An analysis of a material according to the publication Morr and Foegeding, Food Technol. 44, (1990) 100–112, which included three whey protein isolates and eight concentrates, showed that their compositions were clearly different. The mean values of the concentrates and isolates were, respectively, as follows: protein concentration 73.8 and 91.0%; non-protein nitrogen 3.10 and 0.32%; water 5.13 and 3.75%; ash 4.27 and 1.82%; lactose 3.92 and 0.57%; and fat 5.00 and 0.57%.

According to the same publication, the isolates were clearly more functional and of a higher quality than the concentrates with respect to the quantity of fat and protein and with respect to the solubility, foaming capacity and stability of the foam of the protein, the non-denaturing and lumpiness of the protein, and taste and odor. The relatively high lactose and mineral contents of the concentrates, and their poor taste and odor, were factors which limited the use of the concentrates in the food industry.

The good properties and usability of whey protein isolates are limited by the rather high price due to the preparation process.

By changing the structure of the proteins by a chemical reaction it is possible to affect the charge of the molecule, its spatial structure, and thus certain other properties, such as solubility, viscosity, foaming, and partly even emulsification properties.

The most practical and simple chemical method for modifying the structure of the protein molecule is oxidative sulfitolysis, i.e. sulfitolysis and oxidation. Therein the sulfur bridges, i.e. disulfide bonds, between the amino acid chains of the proteins are opened when an oxidation-reduction reaction is initiated by adding sulfite ions; in this reaction one sulfur oxidizes to sulfonate and the other is reduced to a sulfhydryl group.

When an oxidizing factor is also added, the free sulfhydryl groups are reoxidized to disulfide bonds, which in turn continue in the reaction until all of the sulfhydryl groups have sulfonated or some other factor of the reaction has become limiting. The principle of oxidative sulfitolysis is depicted in the following formula:

2RS—SR+2HSO$_3^-$→2RS—SO$_3$+2RSH sulfitolysis

2RSH+oxidant→RS—SR+2H-oxidant oxidation

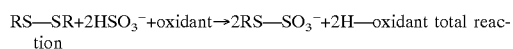
RS—SR+2HSO$_3^-$+oxidant→2RS—SO$_3^-$+2H—oxidant total reaction

Therein RS—SR represents a protein molecule which is made up of two amino acid chains R, S—S being a disulfide bond between two amino acid chains which links the amino acid chains and for its part keeps them locked in a certain position. The modified protein molecules can be precipitated out from the solution by lowering the pH from the pH of the sulfitolysis to a pH of 3–5.

In the publication Kella, N.K.D. et al., J. Agr. Food Chem., 37 (1989), 1203–1210, oxidative sulfitolysis was used for the modification of the molecules of whey protein isolates with the purpose of affecting the functional properties of the proteins, such as solubility, viscosity, foaming, and foam stability. The factor affecting the properties was the decreasing of disulfide bonds in proportion to the total number of original disulfide bonds. Certain properties improved or deteriorated as the number of disulfide bonds decreased. For example, solubility dropped to below 5% even when 25% of the disulfide bonds had disappeared, and at the same time the solubility minimum of the solubility-pH curve changed as follows: the loss of disulfide bonds in % and the corresponding solubility minimum on the pH scale: 25%–pH 4.75; 50%–pH 4.38; 75%–pH 4.2; and 100%–pH 4.0.

In the modification reaction the concentration of protein isolates was 1.0% and that of sulfite was 0.1 M and of urea 4 M, the pH was 7.0 and the temperature 25° C. The oxidant used was oxygen blown through the solution and the catalyst used was $CuSO_4$ dissolved to a concentration of 800 mM. The protein isolates modified to different degrees were isolated by precipitation with ammonium sulfate, which was added to the solution in such an amount that it became 50% saturated. The changed solubility properties were not utilized in the isolation of the proteins.

In the publication Gonzales, J. M., Damodaran, D., Food Sci., 55 (1990) No. 6, 1559–1563, oxidative sulfitolysis was used with the purpose of isolating proteins from a sweet raw whey having a protein content of approx. 0.6%, in almost the same experimental conditions as above: pH 7.0, sulfite concentration 0.1 M, temperature 25° C., the oxidant being oxygen and the catalyst a $Cu^{++}$ ion as $CuCO_3$, but in this case in the form of solid beads and packed in a glass column. The sulfitolysis product was oxidized into a sulfonate derivative by circulating it in the said column filled with beads. Thereafter the bead residues were removed from the liquid reaction mixture by centrifugation. The sulfonated proteins which had chelated with copper were isolated in a functional form by precipitation at pH 4.5. Before the precipitation it was, however, necessary to remove by an EDTA treatment the copper chelated to the sulfonated whey protein. In this case, also, the laboratory-scale implementation was cumbersome and complicated, requiring expensive apparatus and chemicals, as in the previous article. It is not possible to utilize the accelerating effect of elevated temperature, since thereby the solubility of oxygen, and thus its concentration, is lowered. Salts also lower the concentration of oxygen in the solution.

Attempts have long been made to isolate whey proteins as functional products economically by using many types of methods, but the systems described have been deficient, for a number of reasons.

The applications described above, which were based on oxidative sulfitolysis, either did not aim at providing a method of isolation but only a method of modifying certain properties, or the method disclosed is so difficult to exploit on an industrial scale that it cannot be implemented.

DESCRIPTION OF THE PREFERRED EMBODIMENT

An object of the present invention is to provide a method for isolating whey proteins, the method being maximally economical and simple. The invention also aims at a whey protein isolation method which produces a protein which is maximally functional, i.e. capable of emulsification, gel formation and foaming. Another object is a method for preparing whey protein which is maximally healthy and attractive, and suitable for human food.

The invention also aims at a method by which a desired composition is obtained for the protein.

These objects have now been achieved by a new method for isolating whey proteins, the method being mainly characterized in what is stated in the characterizing clause of claim 1.

It has thus been realized in the invention that, in a method in which whey protein is sulfitolyzed, oxidized and precipitated, it is beneficial to use as the oxidant a food-grade oxidative compound, substantially without a catalyst, and a temperature within the range 25°–55° C. at which the oxidative compound will react directly with the sulfitolyzed whey protein. It is thus beneficial to use higher temperatures than previously for the purpose of accelerating the reactions, of shifting the reaction equilibriums to the product side, and of enabling food-grade oxidants to be used. It is beneficial to use as the oxidative agent a food-grade chemical which functions optimally in the conditions used, without causing detrimental secondary reactions. In this respect the present invention differs to its advantage from the above-mentioned method of Gonzales et al., in which an elevated temperature is not used and it is necessary to use, in addition to the oxidant, also a catalyst, which has to be removed both from the reaction mixture and from the completed end product.

The initial substance used in the method according to the invention is either as such a whey obtained from cheese production, or a concentrate thereof. It is preferable that the raw material used in the sulfitolysis and oxidation of step a) is a whey concentrate having a 4- to 16-fold concentration as compared with whey, in which case its whey protein concentration is advantageously approx. 2–7% by weight/volume. To improve the yield of isolated proteins and to reduce the quantity of chemicals needed in the process, the whey is thus preferably concentrated so that the removed amount of water is at minimum approx. 75% by weight.

In the invention the proteins of whey or its concentrate are caused to react with a reagent which forms sulfite ions. The sulfite-forming reagent used may be any reagent known in chemistry which forms sulfite ions. According to one embodiment, the reagent which forms sulfite ions is sulfite, hydrogen sulfite and/or metabisulfite. In this case the cationic component of the salts concerned may be any salt cation, such as ammonium, or a metal of any of groups 1–4 of the Periodic Table of the Elements, such as an alkali metal or an earth alkali metal. It is preferable to use as the reagent which forms sulfite an alkali metal sulfite or earth alkali metal sulfite, hydrogen sulfite, and/or metabisulfite, most preferably sodium sulfite, sodium hydrogen sulfite, and/or sodium metabisulfite. We have observed that the best results are obtained if sodium hydrogen sulfite is used in the method according to the present invention.

It is possible to affect the functional and other properties of the end products in the sulfitolysis of the preparation process by determining the proportion of the amount of sulfite to the number of disulfide bonds in the whey protein. A typical method of calculating the sulfite amount needed for the sulfitolysis of whey protein can be found from the abovementioned publication Gonzales, J. M. and Damodaran, S., J. Food Sci. 55 (1990), 1559–1563, which presentation is incorporated herein by reference. According to one embodiment the concentration of sulfite-forming reagent in the sulfitolysis of step a) is such that the concentration of sulfite in the sulfitolysis mixture will be within a range of approx. 0.02–0.20 M, preferably 0.05–0.10 M.

Thus, in step a) of the method, the proteins of the whey or of a concentrate thereof are sulfonated, i.e. sulfitolyzed, and oxidized. The oxidant used is in accordance with the invention a food-grade oxidative compound, and the temperature is one at which this oxidative compound will react spontaneously and directly with the sulfitolyzed whey protein. Numerous food-grade oxidants are known in the art, for example from the bleaching, maturing, and wetting of foods and intermediates thereof. The literature mentions, for example, various enzymes such as aspergillus flavus-oryzae enzyme, organic peroxides such as acetone peroxide and benzoyl peroxide, inorganic peroxides, and peroxy salts such as ammonium peroxysulfate, potassium peroxysulfate, and calcium peroxide, non-toxic azocompounds such as azodicarbonamide (ADA), nitrosyl chloride, L-cysteine, halogenates such as potassium bromate, mixtures of bromates and iodates, and calcium or potassium iodate. Compounds such as calcium stearoyl-2-lactylate, and chlorine, pure oxygen and ascorbic acid have also been used as food-grade oxidants. It is preferable to use as the food-grade oxidative compound in step a) of the present invention a food-grade peroxide compound and/or halogenate, preferably respectively calcium peroxide $CaO_2$ and/or potassium bromate $KBrO_3$. A preferred concentration of the food-grade oxidative compound is within a range of approx. $0.01 \cdot O_{act}$–$0.15 \cdot O_{act}\%$ by weight/volume, where $O_{act}$ ac represents the concentration of active oxygen in the compound.

To optimize the method according to the invention, it is also necessary to determine a suitable reaction temperature, the pH to be used in the precipitation, and the acids and bases to be used in the pH adjustments, as well as the suitable procedures and methods for obtaining the desired properties in the product, which may be a protein paste or a spray-dried powder.

According to one preferred embodiment, the sulfitolysis and oxidation temperature of step a) is approx. 30°–50° C. The preferred pH, at which sulfitolysis and oxidation occur, is within a range of approx. 5.0–8.5.

According to one preferred embodiment of the invention, the sulfitolysis and oxidation of step a) are carried out in two sub-steps so that $a_1$) the whey or a concentrate thereof is contacted with a reagent which forms sulfite ions, in order to sulfitolyze the whey protein, and $a_2$) the sulfitolyzed whey protein from step $a_1$) is contacted with a food-grade oxidative compound in order to oxidize the sulfitolyzed whey protein. In this case sub-step $a_1$) is preferably carried out at a pH of approx. 6.0–7.5, and most preferably at a pH of 6.5–7.0, in which case the reaction time is preferably approx. 10–50 minutes. Sub-step $a_2$) is preferably carried out at a pH of approx. 5.0–7.0, and most preferably at a pH of approx. 5.5–6.5, in which case the reaction time is preferably approx. 15–60 minutes. Preferably the same temperature, i.e. the temperature of step a) mentioned above, is used in steps $a_1$) and $a_2$).

By the above-mentioned factors it is possible to affect not only the functional and other properties of the end product but also the yield of precipitated proteins and the proportions of the different proteins present in whey, β-lactoglobulin, α-lactalbumin, and bovine serum albumin (BSA), in the precipitate and the filtrate.

In the method according to the invention, first the whey or a concentrate thereof is sulfitolyzed and oxidized, and thereafter the sulfitolyzed and oxidized whey protein is precipitated out at an acid pH from the reaction mixture of whey or a concentrate thereof. The precipitation step b) is preferably carried out by using a pH value of approx. 2.5–6.5, and most preferably a pH value of 3.0–5.0. In this case the sulfitolyzed and oxidized whey protein will precipitate and, the pH being clearly on the acid side and the temperature being sufficiently high, preferably within the range 25°–55° C., most preferably within the range 30°–50° C., there will additionally occur a removal of the sulfone groups, formed in the sulfitolysis and oxidation, in the form of sulfur dioxide, which is directed to a reception container for reuse in sulfitolysis. Thus the sulfur dioxide of the sulfitolysis is recovered and the process will not burden the environment.

It is preferable to use in the precipitation step b) of the method a slow adjustment of the pH value to the said pH value for precipitation. It is especially preferable if the adjustment of the pH, when a shift is being made from the sulfitolysis and oxidation of step a) to the precipitation of step b), takes place within 10–40 minutes. In general, after the pH adjustment of step b) a stirring of the mixture is carried out, which preferably lasts for approx. 10–60 minutes.

In the isolation process there tend to arise delays if successive treatment is used in the sulfonation and precipitation step b). Acceleration can easily be achieved by using so-called alternate treatment, in which case one reactor can be emptied and refilled while sulfonation and precipitation are taking place in the other reactor.

In the method according to the invention, oxidative sulfitolysis is thus achieved by the use of a food-grade oxidative chemical; the reaction caused by it can be adjusted by means of the chemical amount and the external conditions such as pH, the temperature and the action time, so that the end result will be of the desired type with respect to taste, nutritional quality, functionality and protein composition.

The precipitation step b) is followed by the final step c), in which the precipitated sulfitolyzed and oxidized whey protein is recovered from the product mixture and is possibly after-treated. According to one embodiment, the sulfitolyzed and oxidized whey protein precipitated in step b) is concentrated and washed in step c), preferably by microfiltration. The isolation can be continued by removing water from the precipitate concentrate of step c) by centrifugation or by filtration in, for example, a band or drum filter, in which case a usable protein paste is produced as a result. The protein paste can be made more usable as a product by raising its pH to a value of 6–8 by means of a base or a base mixture, which is preferably NaOH or a mixture of NaOH, $Ca(OH)_2$ and KOH, in which case the amount of $Ca(OH)_2$ is preferably such that it will at minimum replace the original Ca amount.

Onward processing of the precipitate concentrate of step c) can also be carried out so that its is spray dried to a powder product, in which the pH of the precipitate concentrate is preferably adjusted before it to a value of 6–8 by means of a base or a base mixture, which is preferably the same as in the said adjustment of the pH of the paste.

According to one embodiment of the invention, the isolation of the whey proteins takes place in the following sequences: concentration of the whey by ultrafiltration; modification of the structure of the proteins in the concentrate by sulfitolysis and oxidation; precipitation by lowering the pH; concentration of the precipitated proteins and their wash by microfiltration; separation by centrifugation or filtration or by spray drying; and concentration and wash of unprecipitated proteins, and their separation by spray drying.

The concentration of whey is started by microfiltation, whereby any casein particles are removed from the whey, and the quantities of bacteria and phospholipoproteins are lowered. In consequence to microfiltration, ultrafiltration is facilitated.

The obtained filtrate from microfiltration is ultrafiltered by using 9000–40000 D membranes to concentrate the protein content from an original of approx. 0.6% to 4- to 16-fold, which corresponds to a protein proportion of 2–7%. A preferred protein concentration in the concentrate is 8-fold the original, i.e. approx. 4%. In this case they dry weight of the concentrate is 11–12%, which is in the main due to lactose in addition to protein.

The modification of the structure of whey concentrate proteins is carried out by means of sulfitolysis and oxidation, wherein the sulfhydryl groups of the disulfide bonds and the free sulfhydryl groups are sulfonated quantitatively to the desired level. The whey protein sulfitolysis and oxidation are implemented in this embodiment as follows:

The necessary amount of a whey concentrate having a protein concentration of, for example, 4%, is placed in a reactor which has effective stirring, as well as measurement and control of the temperature and pH.

The temperature of the concentrate is adjusted to 30°–50° C., for example 35°–45° C. The selection of the temperature depends on, for example, the desired reaction velocity, the chemicals used, and the functional and other properties desired for the proteins to be isolated. Sulfite as $NaHSO_3$, $Na_2S_2O_5$ or $Na_2SO_3$, in an amount of 0.2–0.2 M, e.g. 0.05–0.1 M, is added to a constant-temperature whey concentrate, and the mixture is stirred effectively. The amount of sulfite to be added depends on, for example, the protein concentration and the desired degree of sulfitolysis.

The pH is adjusted to the range 6.0–7.0, e.g. 6.5. Food-grade acids and bases, such as HCl and NaOH, are used for the adjustment of the pH. The reaction time during which the sulfite acts on the proteins is 10–50 minutes, preferably 20–40 minutes. The time is determined by the joint effect of the above-mentioned factors to achieve the desired reaction equilibrium.

Thereafter the oxidant is added into the reactor. The oxidants which can be used are those food-grade oxidative chemicals the activity of which can, under the conditions concerned, be controlled so that the proteins can be isolated effectively and that the proteins will have the desired properties and composition. Usable chemicals include bromates, e.g. $KBrO_3$ (amount of active oxygen 28.6%), and peroxides, e.g. $CaO_2$ (amount of active oxygen 22.2%). The amount of oxidant is determined according to the amounts of sulfhydryl groups to be oxidized and the amount of active oxygen in the oxidant, e.g. the amount of $CaO_2$ is 0.1–1.0%, preferably 0.2–0.6%, of the volume of the mixture (% by weight/volume) in a whey concentrate having a protein content of 2–7%.

The pH of the whey concentrate is adjusted to 5.0–7.0, e.g. 5.5–6.5. The selection of the pH depends on how rapid an oxidation reaction is desired and how it is desired to affect the properties of the end product. The reaction temperature may be the same as in the sulfitolysis, or it may be changed within the values given above, in order to regulate the reaction velocity.

The reaction time may be 15–60 minutes, preferably 30–45 minutes. During this time the concentrate is stirred effectively. The length of the time can be used for affecting the completeness of the reaction and, together with activity, the yield, composition and properties of the proteins.

All the important variables of oxidative sulfitolysis, i.e. the protein content of the whey concentrate, the amount of sulfite, the reaction mixture pH values and temperatures used in the various steps, the properties and amount of the oxidative compound, and the reaction times used in the various steps, can be used for affecting the realization of the various part reactions of the isolation process and, as a whole, the end result of the entire process, i.e. the quantity, composition, and desired properties of the proteins isolated.

After any desired modification, the proteins are precipitated by lowering the pH slowly to 3.5–5.0, preferably 4.0–4.5. The pH used in the precipitation is dependent on, for example the degree of oxidative sulfitolysis, i.e. what proportion of the existing disulfide bonds and free sulfhydryl groups have been sulfonated. The time used for the precipitation is 10–60 minutes, e.g. 20–40 minutes. The concentration and washing of the precipitated proteins is carried out by microfiltration and the isolation by filtration in a band or drum filter or by centrifugation, in which case the product obtained will be protein paste.

Washing in connection with the concentration is important, since thereby any lactose present in the concentrate, and at the same time any extra chemicals added and any salts formed in the precipitation, which would otherwise be left in the protein preparation, can be removed.

The end product is prepared from the paste by raising its pH to 6–8 by adding NaOH and $Ca(OH)_2$ or NaOH, KOH and $Ca(OH)_2$ at suitable proportions. The adding of calcium to isolated whey proteins will restore their original calcium balance and improve their gelling properties. The precipitate concentrate can also be dried by means of a spray drier, in which case the product will be a dry powder. Before the drying, the pH of the washed precipitate must be raised to 6–8 by using the above-mentioned bases; this will give the same properties also to the dried product.

In the concentration of precipitated proteins, the filtrate produced by microfiltration is concentrated and washed by ultrafiltration. The pH of the washed concentrate is adjusted to 6–8 by using the above-mentioned bases and is dried into powder by means of a spray drier.

The following examples illustrate the invention described above.

EXAMPLE 1

A separated, fresh pre-whey formed in the production of Edam cheese, the whey having a protein content of 0.60% (protein nitrogen ×6.38) and a protein content calculated according to total nitrogen (also other nitrogen compounds) of 0.80%, was microfiltered using an 0.45 $\mu$ filtration membrane in a Millipore Pellicon laboratory apparatus. The microfiltrate was concentrated by ultrafiltration in the same apparatus through 10000 D ultrafiltration membranes in such a manner that one portion of the filtrate was concentrated 4× and another portion 8×, i.e. the final volumes of the concentrates were 25% and 12.5% of the respective initial volumes. The respective protein contents were 2.06% by weight/volume and 4.01% by weight/volume. For isolation, 1.0 liter of a 4× whey concentrate was taken into a 2-liter glass vessel. It was kept in a temperature-controllable water-bath, and its content was mixed with an effective stirrer. The temperature of the concentrate was adjusted to 35° C. To initiate sulfitolysis, 5.2 g of $NaHSO_3$ was added to the concentrate, and the pH was adjusted to 6.5 by adding NaOH. The mixture was stirred and the reaction was allowed to continue for 30 minutes. Thereafter, 1.0 g of $KBrO_3$ was added to the mixture. The pH was maintained at 6.5. The oxidation reaction took 15 minutes. Thereafter the proteins were precipitated by lowering the pH to 4.40 by adding HCl to the mixture. The precipitate was stirred for a further 30 minutes.

The precipitate was separated by centrifugation in a Sorvall RC-5B centrifuge at 10000 rpm for 30 minutes. The precipitated proteins separated well. The proteins were washed by suspension in distilled water and by re-centrifugation. The protein paste was easily detachable and split easily into pieces. It was stored in a glass vessel with a cover and was frozen. The protein yield determined by centrifugation was 3.0 g/100 ml of whey concentrate. The protein yield was determined by centrifuging 20 ml of precipitate +10 ml of distilled water in 50 ml centrifuge tubes for 30 minutes at 10000 rpm. After centrifugation, the supernatant was poured off and the tubes were kept upside down on a water-absorbent base for about 15 minutes to drain any loose water, whereafter they were weighed within 5–10 minutes. The results of parallel determinations were very close to each other. The results thus obtained correlated well with the protein assays, but were higher than these by the bound water amount. The determinations were considerably more rapid and easier to perform, and therefore they were used for determining the yields.

EXAMPLE 2

1.0 liter of the 8× concentrated whey concentrate mentioned in the preceding example, having a protein content of 4.01%, was heated to 45° C. and was stirred effectively. 10.40 g of $NaHSO_3$ was added to it. The pH was adjusted to 6.5. The reaction time of the sulfitolysis was 30 minutes. Thereafter 2.0 g of $KBrO_3$ was added to the mixture. The pH was maintained at 6.5. The reaction time of the oxidation was 15 minutes. At the end of the reaction time the proteins were precipitated by lowering the pH to 4.45 by means of HCl. The mixture was 20 stirred for a further 30 minutes to bring the precipitation to completion.

The proteins were separated and washed by centrifugation as in Example 1. The proteins were easily detachable and easy to split into pieces. The isolated protein paste was frozen in a glass vessel with a cover for later use. The protein yield determined by centrifugation was 8.0 g/100 ml of whey concentrate.

EXAMPLE 3

1.0 liter of pre-whey formed and separated in the preparation of Edam cheese, concentrated 4× in the manner described in Example 1, and having a protein content of 1.92%, was taken and was heated to 35° C. while stirring effectively. 5.2 kg of $NaHSO_3$ was added to the concentrate. The pH was adjusted to and maintained at 6.5. The reaction time was 30 minutes. After the sulfitolysis reaction, 2.2 g of $CaCO_2$ (lxper 60 C, Peroxid Chemie GmbH, Germany; amount of active oxygen approx. 13.3%) was added to the mixture. The pH was maintained at 6.5. The oxidation time was 15 minutes, during which the mixture was stirred effectively. After the oxidation the proteins were precipitated by lowering the pH to 4.45 by means of HCl. Stirring was continued for a further 15 minutes. The proteins were separated and washed, and were stored as in Example 1. The isolated protein paste was soft and brittle, and not easy to spread. The protein yield determined by centrifugation was 1.75 g/100 ml of whey concentrate.

EXAMPLE 4

1.0 liter of 8× concentrated concentrate was taken from the whey concentrates prepared in Example 3, the protein content of the concentrate also being 4.01%. The concentrate was heated to 45° C. and was stirred effectively. 10.40 g of $NaHSO_3$ was added to it. The pH was adjusted to and maintained at 6.5. The reaction time was 30 minutes. Thereafter, 4.3 g of $CaCO_2$ (lxper 60 C, Peroxid Chemie GmbH, Germany) was added to the mixture. The pH was maintained at 6.5. The oxidation time was 15 minutes. After the oxidation the proteins were precipitated by lowering the pH to 4.45 by means of HCl. Stirring was continued for a further 15 minutes. The proteins were separated, washed, and stored as in Example 1. The protein paste was rather soft and brittle, and not spreadable. The protein yield determined by centrifugation was 8.85 g/100 ml of whey concentrate. Two approx. 10 g samples were taken of the protein paste; the pH of one of the samples was raised to approx. 6.5 by adding 0.4 ml of 1.0 N NaOH and by mixing well, and 0.25 ml of 1.0 N NaOH and 0.15 ml of saturated $Ca(OH)_2$ were added to the other sample. After the raising of the pH the first sample was soft, spreadable, not lumpy and not sticky. The second sample was somewhat stiffer than the first one, but spreadable, not lumpy and not sticky.

EXAMPLE 5

Separated, fresh preliminary whey formed in the preparation of Edam cheese, having a protein content of 0.59%, was microand ultrafiltered using the same apparatus and the same procedure as in Example 1 to 8× and 16×, whereupon the protein contents were respectively 3.92% and 7.00%. 1.0 liter of the 8× concentrated whey concentrate having a protein content of 3.92% was heated to 45° C., and it was stirred continuously.

9.50 g of $Na_2S_2O_5$ was added to it. The pH was adjusted to 6.5 by means of NaOH. The sulfitolysis reaction time was 15 minutes. Thereafter 4.30 g of $CaO_2$ was added to the mixture. The pH was adjusted to 5.5, and the oxidation reaction time was 30 minutes. After the oxidation the pH was lowered to 4.0 by means of HCl in order to precipitate the proteins. The precipitate was stirred for a further 15 minutes. The precipitate was microfiltered using a 0.45 μ membrane in the same Millipore laboratory apparatus as that in which the whey had been treated and concentrated approx. 2×. The filtration was rapid and the filtrate was clear, which indicated that precipitated proteins had not passed the filtration membrane. The concentrate was washed twice with its own volume of distilled water. The pH of the concentrate was raised to 6.5. The dry matter content and ash in the concentrate were about 30% of the original content, as was the intention. The concentrate was freeze-dried and stored in a refrigerator for later use. An assay was performed on the filtrate by using HPLC to determine the retaining of the proportions of whey proteins after the precipitation and isolation. The protein yield determined by centrifugation was 9.3 g/100 ml of whey concentrate.

EXAMPLE 6

1.0 liter of the 8× concentrated whey concentrate described in the preceding example, having a protein content of 3.93%, was heated to 45° C. and was stirred continuously. 9.5 g of $Na_2S_2O_5$ was added to it, and the pH was adjusted to 6.5 by means of NaOH. The sulfitolysis lasted for 15 minutes. Thereafter 2.2 g $CaO_2$ was added as the oxidant to the mixture, and the pH was adjusted to 5.5. The reaction time was 30 minutes. The proteins were precipitated by lowering the pH to 4.0 by means of HCl. The mixture was stirred for a further 15 minutes. The precipitate was concentrated by microfiltration to 2× and was washed twice with its own volume of distilled water, as in the preceding example. The pH of the precipitate concentrate was raised to 6.6. Its dry matter content decreased to approx. 31% from the original value. The precipitate concentrate was freeze-dried and stored in a refrigerator. The filtrate from the microfiltration was concentrated approx. 2× by ultrafiltration using a 10000 D membrane in a Millipore laboratory apparatus, as in the preparation of the whey concentrates used in the examples. The filtrate concentrate washed twice with its own volume of distilled water, whereafter its pH was raised to 6.4. The dry matter content of the concentrate decreased to approx. 31% of the original. The concentrate was freeze-dried for storage. An assay with HPLC was performed on the microfiltrate of the precipitate to determine the retaining of the proportions of the whey proteins after the treatment and precipitation. A comparison of the results with the results of the preceding example showed that the proportions of the proteins changed as a consequence of different treatments. Different treatments can be used for affecting the protein yields and also for affecting the proportions of the proteins in the precipitate and the filtrate. The protein yield determined by centrifugation was 8.1 g/100 ml of whey concentrate.

EXAMPLE 7

1.0 liter of the 16× concentrated whey concentrate mentioned in Example 5, having a protein content of 7.0%, was heated to 45° C. while stirring. 12.6 g of $Na_2SO_3$ was added to it. The pH was adjusted to 6.5. The reaction time of sulfitolysis was 15 minutes. Thereafter 4.3 g of $CaO_2$ was added to the mixture. The pH was adjusted to 6.0. The oxidation time was 30 minutes. The proteins were precipitated by lowering the pH to 4.0. Stirring was continued for a was continued for a further 15 minutes to bring the precipitation to completion. The proteins were separated and washed by centrifugation as in Example 1. The isolated protein paste was frozen in a glass vessel with a cover for later use. The protein yield determined by centrifugation was 12.0 g/100 ml of hey concentrate.

I claim:

1. A process for isolating proteins from whey, wherein
   a) the whey or a concentrate thereof is brought into contact with a reagent which forms sulfite ions, and an oxidant, whereby the whey protein becomes sulfitolyzed and oxidized,
   b) the sulfitolyzed and oxidized whey protein is precipitated out from the whey or concentrate thereof at an acid pH, and
   c) the precipitated sulfitolyzed and oxidized whey protein is recovered from the product mixture and is optionally subjected to an after-treatment, wherein the oxidant used in step a) is a food-grade oxidative compound containing at least one oxygen atom and is used substantially without a catalyst at a temperature within the range 30°–55° C., at which the oxidative compound reacts directly with the sulfitolyzed whey protein, the process being performed without the participation of copper ion.

2. A process according to claim 1, wherein the concentration of whey protein present in the whey concentrate of step a) is 4-fold to 16-fold higher than in the whey from which it was obtained, and has a concentration of 20–70 grams/liter.

3. The process according to claim 2, wherein the concentration of whey protein present in the whey concentrate of step a) is about 8-fold higher than in the whey from which it was obtained, and is about 40 grams/liter.

4. A process according to claim 1, wherein the sulfite-ion forming reagent used in step a) consists of at least one compound selected from the group consisting of an alkali metal, earth alkali metal sulfite, hydrogen sulfite, and metabisulfite.

5. The process according to claim 4, wherein said sulfite-forming reagent is selected from a group consisting of sodium sulfite, sodium hydrogen sulfite, and sodium metabisulfite.

6. The process according to claim 5, wherein said sulfite-forming reagent is sodium hydrogen sulfite.

7. A process according to claim 1, wherein in step a) the concentration of sulfite-ion forming reagent is such that the concentration of sulfite in the sulfitolysis mixture will be within a range of approximately 0.02–0.20 M.

8. The process according to claim 7 wherein in step a) the concentration of sulfite-ion forming reagent is such that the concentration of sulfite in the sulfitolysis mixture will be within a range of approximately 0.05–0.1 M.

9. A process according to claim 1, wherein the food-grade oxidative compound used in step a) is a food-grade peroxide compounds, a halogenate or a mixture thereof.

10. The process according to claim 9, wherein said peroxide is calcium peroxide $CaO_2$ and said halogenate is potassium bromate $KBrO_3$.

11. A process according to claim 1, wherein in step a) the content of the food-grade oxidative compound is within a range of approximately $0.01 \bullet O_{act}$–$0.15 \bullet O_{act}$ % by weight/volume, where $O_{act}$ stands for the content of active oxygen in the compound.

12. The process according to claim 11, wherein the pH is about 3.0–5.0.

13. A process according to claim 1, wherein step a) is performed at a pH of approximately 5.0–8.5.

14. A process according to claim 1, wherein step a) is performed at a temperature of approximately 30°–50° C.

15. A process according to claim 1, wherein step a) is performed in two sub-steps, in such a manner that:
   $a_1$) the whey or a concentrate thereof is contacted with a sulfite-ion forming reagent to sulfitolyze the whey protein, and
   $a_2$) the sulfitolyzed whey protein of step $a_1$) is contacted with a food-grade oxidative compound to oxidize the sulfitolyzed whey protein.

16. A process according to claim 15, wherein sub-step $a_1$) is performed at a pH of approximately 6.0–7.5.

17. The process according to claim 16, wherein sub-step $a_1$) is performed at a pH of approximately 6.5–7.0.

18. A process according to claim 15, wherein the whey or a concentrate thereof is subjected to sulfitolysis for approximately 10–50 minutes.

19. A process according to claim 15, wherein sub-step $a_2$) is performed at a pH of approximately 5.0–7.0.

20. The process according to claim 19, wherein sub-step $a_2$) is performed at a pH of approximately 5.5–6.5.

21. A process according to claim 15, wherein the sulfitolyzed whey protein is subjected to oxidation for a period of 15–60 minutes.

22. A process according to claim 15, wherein substantially the same temperature is used in sub-steps $a_1$) and $a_2$).

23. A process according to claim 1, wherein in step b) the sulfitolyzed and oxidized whey protein is recovered by precipitation at a pH of about 2.5–6.5.

24. A process according to claim 23, wherein in step b) the precipitation is performed at a temperature of 25°–55° C.

25. The process according to claim 24, wherein the precipitation is performed at a temperature of about 30°–50° C.

26. A process according to claim 23, wherein the pH of the product mixture is adjusted gradually to the precipitation pH value.

27. A process according to claim 23, wherein the transition from the pH of step a) to the pH of step b) occurs over a period of 10–40 minutes.

28. A process according to claim 27, wherein the mixture is stirred for about 10–60 minutes subsequent to the pH adjustment of step b).

29. A process according to claim 1, wherein the precipitation of step b) is carried out alternately in at least two vessels, so that both the sulfitolysis and oxidation of step a) and the precipitation of step b) are carried out in said at least two reactors alternately, one reactor being emptied and refilled while sulfitolysis, oxidation and precipitation are being performed in the other.

30. A process according to claim 1, wherein in step c), the precipitated sulfitolyzed and oxidized whey protein is concentrated and washed, thereby producing a whey protein precipitate concentrate.

31. A process according to claim 30, wherein the proteins of the filtrate of step c) are concentrated and washed by ultrafiltration and are separated from water by spray drying.

32. The process according to claim 30, wherein concentration and washing of the whey protein precipitate is effected by microfiltration.

33. A process according to claim 30, wherein in step c) water is removed from the precipitate concentrate by centrifugation or filtration, preferably in a band or drum filter, thereby producing a protein paste.

34. A process according to claim 33, wherein in step c) the pH of the protein paste is raised to a value of 6–8 by addition of an alkaline compound or mixture.

35. The process according to claim 34, wherein the alkaline compound is NaOH or a mixture of NaOH, $Ca(OH)_2$ and KOH.

36. The process according to claim 35, wherein an alkaline mixture containing NaOH, $Ca(OH)_2$ and KOH is used and wherein at least one equivalent of $Ca(OH)_2$ relative to the quantity of $Ca^{++}$ present prior to addition of said alkaline mixture, is employed.

37. A process according to claim 30, wherein the pH of said whey protein precipitate concentrate is adjusted to a value of 6–8 by addition of an alkaline compound or a mixture of alkaline compound.

38. The process according to claim 37, wherein the alkaline compound is NaOH and the alkaline mixture contains NaOH, $Ca(OH)_2$ and KOH.

* * * * *